(12) United States Patent
Ishihara et al.

(10) Patent No.: US 11,479,121 B2
(45) Date of Patent: Oct. 25, 2022

(54) PANEL DEVICE

(71) Applicant: KABUSHIKI KAISHA TOKAI RIKA DENKI SEISAKUSHO, Aichi (JP)

(72) Inventors: Akito Ishihara, Aichi (JP); Yusuke Nomura, Aichi (JP); Yuki Sakai, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/388,994

(22) Filed: Jul. 29, 2021

(65) Prior Publication Data
US 2022/0032774 A1 Feb. 3, 2022

(30) Foreign Application Priority Data
Aug. 3, 2020 (JP) .............................. JP2020-131707

(51) Int. Cl.
*B60K 35/00* (2006.01)
(52) U.S. Cl.
CPC .......... *B60K 35/00* (2013.01); *B60K 2370/16* (2019.05); *B60K 2370/34* (2019.05); *B60K 2370/774* (2019.05)

(58) Field of Classification Search
CPC .......... B60K 2370/34; B60K 2370/343; B60K 2370/345; B60K 2370/347; B60K 2370/349; G09F 13/06; G09F 13/08
See application file for complete search history.

(56) References Cited

U.S. PATENT DOCUMENTS

| | | | |
|---|---|---|---|
| 2003/0043108 A1* | 3/2003 | Iwase | B60K 37/02 430/18 |
| 2018/0204493 A1 | 7/2018 | Sakamaki et al. | |
| 2019/0331959 A1* | 10/2019 | Weindorf | G02F 1/133512 |
| 2019/0381884 A1* | 12/2019 | Kawashima | B60K 35/00 |
| 2021/0070174 A1* | 3/2021 | Marutani | G09F 21/04 |
| 2021/0107400 A1* | 4/2021 | Erler | B60K 35/00 |
| 2022/0032774 A1* | 2/2022 | Ishihara | B60K 35/00 |

FOREIGN PATENT DOCUMENTS

JP 6350489 B2 7/2018

* cited by examiner

*Primary Examiner* — Andrew J Coughlin
(74) *Attorney, Agent, or Firm* — Tarolli, Sundheim, Covell & Tummino LLP (57) ABSTRACT

A panel device includes a panel unit, a light source, and a light-blocking layer. The panel device includes a light attenuation layer, or a tinted layer, to blacken the panel unit. The light attenuation layer is located between the light source and the light-blocking layer, specifically, on the rear surface of the light-blocking layer.

8 Claims, 5 Drawing Sheets

PANEL DEVICE

RELATED APPLICATIONS

The present invention is a Nonprovisional Application under 35 USC 111(a), claiming priority to Serial No. JP 2020-131707, filed 3 Aug. 2020 the entirety of which is incorporated herein by reference.

BACKGROUND

1. Field

The present invention relates to a panel device that displays representations.

2. Description of Related Art

Japanese Patent No. 6350489 discloses a conventional display device as an example of a panel device for a vehicle that is used for operating on-board devices of a vehicle. The display device includes, for example, an outer panel, a liquid crystal display, and a display formation plate. An image displayed by the liquid crystal display is projected through the display formation plate onto the outer panel so that the display device shows various representations on the outer panel.

SUMMARY

The display formation plate includes, for example, a light-projecting base material sheet, a light-blocking printed layer, and a tinted printed layer. In the display formation plate, a light-blocking printed layer is arranged on the rear surface of the tinted printed layer. The order in which the layers are arranged may affect the quality of the panel device.

For example, when viewing the panel device from the outer side, a step formed between the tinted printed layer and the light-blocking printed layer may be visible and thereby lower the aesthetic appeal. Further, when the outer panel is of a touch-operable type, a sheet of a capacitance sensor or the like is attached to the rear surface of the light-blocking printed layer. In this case, the sheet may not be securely fixed to the light-blocking printed layer at the boundary of the tinted printed layer and the light-blocking printed layer. This may affect the sensitivity of the sensor.

One objective of the present disclosure is to provide a panel device with improved quality.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a panel device includes a panel unit, a light-blocking layer, a light source, and a light attenuation layer. The panel unit is light-transmissive and one of colored or colorless. The light-blocking layer includes an opening shaped in correspondence with a representation displayed on the panel unit. The light source emits light from a rear side of the panel unit and displays the representation on the panel unit with the light passing through the opening. The light attenuation layer attenuates ambient light to further darken light in cooperation with the light-blocking layer. The light attenuation layer is located between the light source and the light-blocking layer.

Definitions

The opening includes at least one of a window frame, a mark opening, and an indicator opening. The representation includes at least one of an image, a mark, and an indicator.

The present disclosure improves quality of the panel device.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of a panel device will now be described. In the description hereafter, to facilitate understanding, configurations may be partially exaggerated or simplified in the drawings. Further, elements in the drawings may not be to scale.

Figure 1:
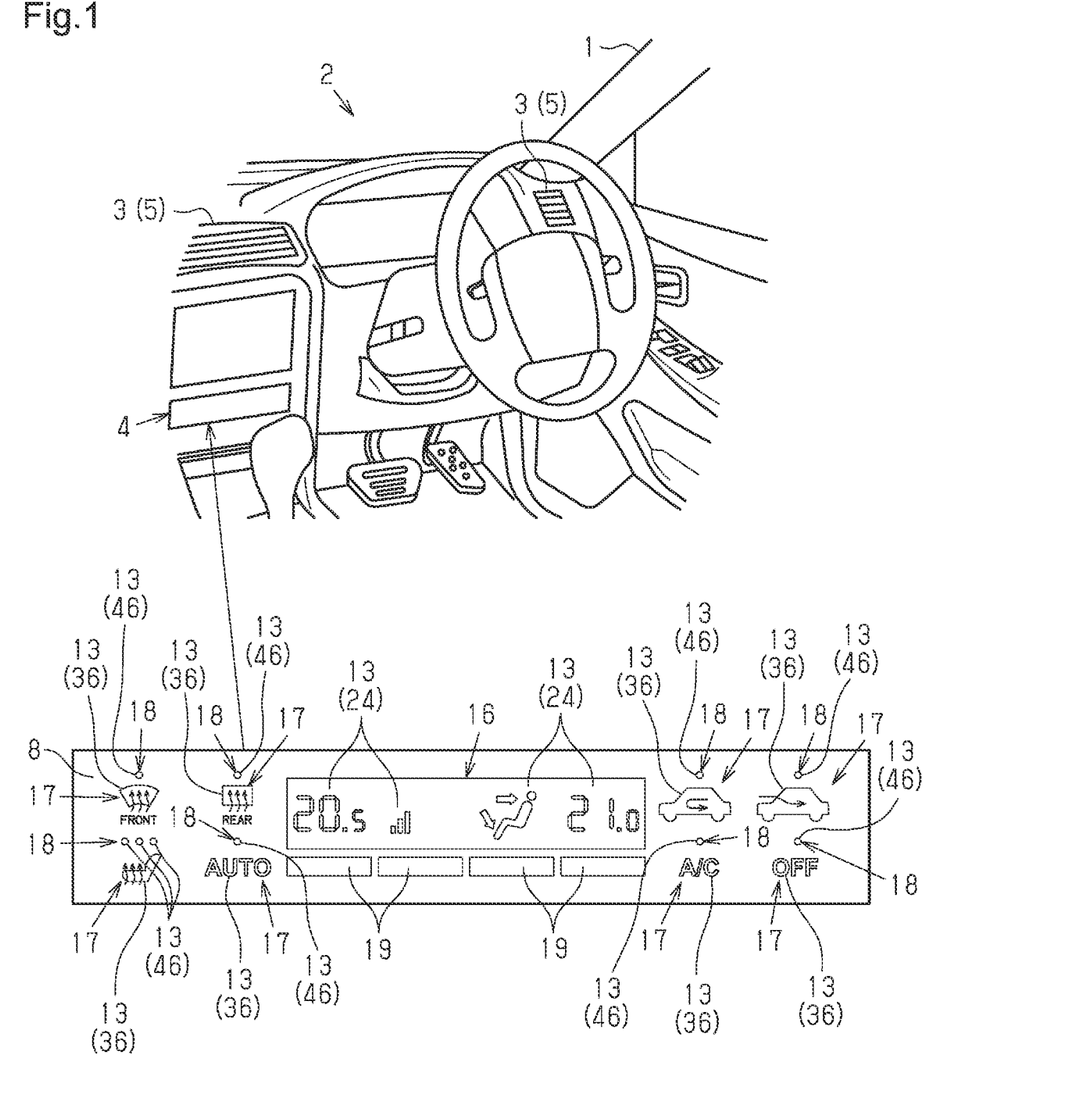
FIG. 1 is a front view of a panel device in accordance with an embodiment.

As shown in FIG. 1, a panel device 4 is arranged near a driver seat 2 of a vehicle 1 and operated to switch operation state of an on-board device 3. The panel device 4 is of a type that includes a panel display function, a touch-operation function, an indicator function, and the like. The panel display function displays, for example, the present operation state of the device 3 and shows symbols related to the device 3. The touch-operation function switches, for example, the operation state of the device 3 when the panel device 4 is touched. The indicator function indicates, for example, the operation state of the device 3 by switching a light on and off. The device 3 includes, for example, an air conditioner 5 that air-conditions the passenger compartment.

Figure 2:
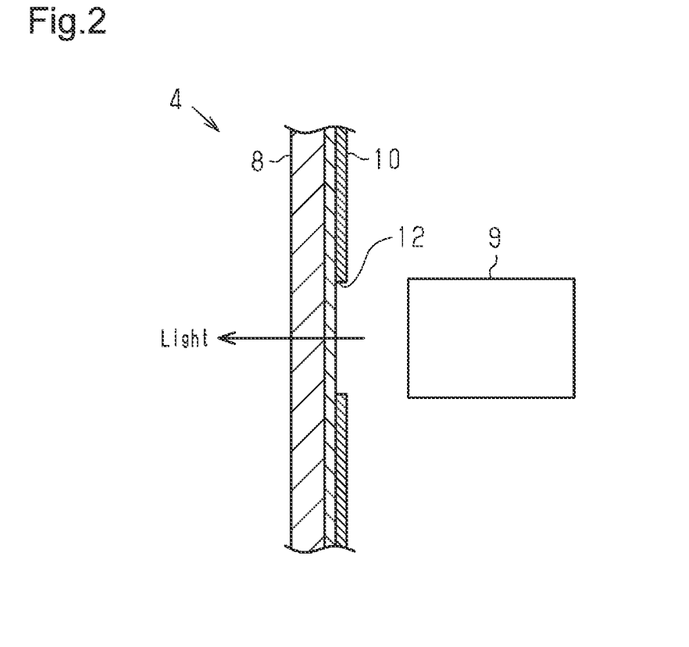
FIG. 2 is a cross-sectional view of the panel device.

As shown in FIG. 2, the panel device 4 includes a panel unit 8, a light source 9, and a light-blocking layer 10. In the description hereafter, a rear side refers to the side of the panel unit 8 opposite to the outer side that is visible to the user. The rear side of the panel unit 8 is where the light source 9 is located. Further, a rear surface refers to a surface directed toward the side opposite to the visible side. The panel unit 8, which is light-transmissive, is colored or colorless. In the present example, the panel unit 8 is colored and light-transmissive. The panel unit 8 has, for example, a black background corresponding to the color of the light-blocking layer 10, which is printed in black (black printed). The light-blocking layer 10 includes an opening 12 that is shaped in correspondence with a representation 13 shown on the panel unit 8 (refer to FIG. 1, etc.). The light source 9 emits light from the rear side of the panel unit 8, and the representation 13 is displayed on the panel unit 8 by the light passing through the opening 12.

As shown in FIG. 1, the panel device 4 includes a display 16, symbol portions 17, and indicator portions 18. The display 16 shows the present operation state of the device 3 on the panel device 4. The symbol portions 17 implement the touch-operation function of the panel device 4. The indicator portions 18 implement the indicator function of the panel device 4. The panel device 4 may only include one of the display 16, the symbol portions 17, and the indicator portions 18. In the present example, the panel device 4 includes all three.

The symbol portions 17 are paired with the corresponding indicator portions 18. A single symbol portion 17 may be combined with a single indicator portion 18 to form a single set. Alternatively, a single symbol portion 17 may be combined with multiple indicator portions 18 to form a set. In the present example, the symbol portion 17 for a seat heater is provided with multiple (three in present example) indicator portions 18.

The panel device 4 includes multiple switches 19 operated to switch states of various functions shown on the display 16. Each switch 19 is, for example, a toggle switch. The switches 19 are arranged in correspondence with the representations 13 shown on the display 16. In the present example, the switches 19 include a driver seat temperature adjustment switch 19, a fan mode switch 19, an airflow adjustment switch 19, and a passenger seat temperature adjustment switch 19.

Figure 3:
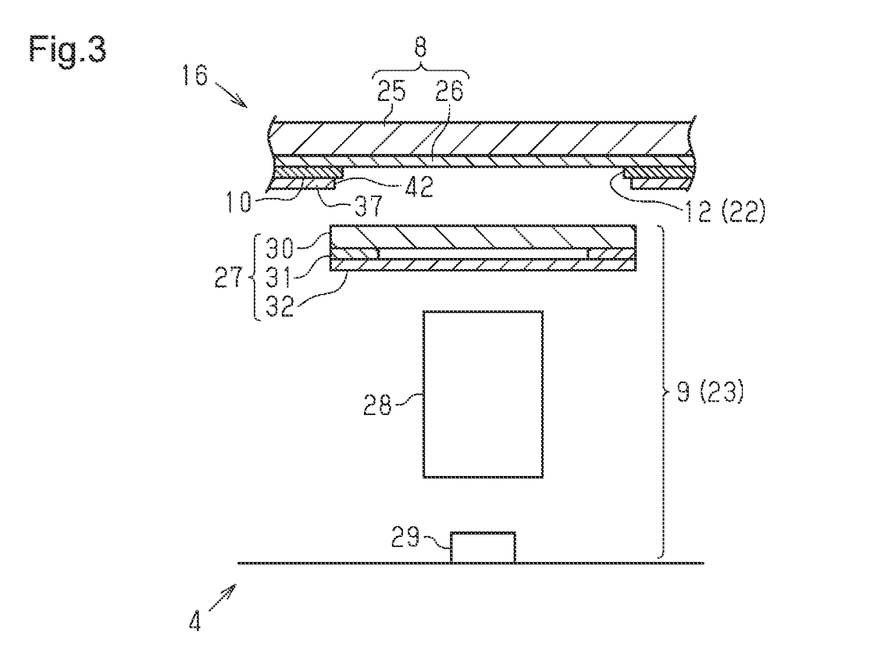
FIG. 3 is a cross-sectional view showing the structure of a display.

As shown in FIG. 3, the display 16 includes a window frame 22 that defines an opening 12 and an image displaying unit 23 that serves as the light source 9. The window frame 22 is arranged opposing the light source 9. The image displaying unit 23 projects an image 24 that serves as the representation 13 from the rear side of the panel unit 8 through the window frame 22 onto the panel unit 8. This displays the image 24 on the panel unit 8.

The specific structure of the display 16 will now be described. The panel unit 8 includes, for example, a resin panel 25 and a rear film 26. The resin panel 25 is, for example, a tinted panel (light attenuation member). The rear film 26 is adhered to the rear surface of the resin panel 25. For example, the rear film 26 includes a transparent film. The panel unit 8 may be, for example, flat or curved.

The light-blocking layer 10 is arranged on, for example, the rear surface of the rear film 26. In an example, the light-blocking layer 10 is printed in black. The light-blocking layer 10 is printed on, for example, the rear surface of the rear film 26. The light-blocking layer 10 is formed from a material that does not transmit light from the image displaying unit 23 to the panel unit 8. The light-blocking layer 10 is formed by performing, for example, laser printing, screen printing, ink-jet printing, pad printing, or the like.

The image displaying unit 23 includes, for example, a displaying unit 27, a lens 28, and a light emitting element 29. The displaying unit 27 includes an image display module 30 configured to display various images. The image display module 30 may be, for example, a liquid crystal display (LCD) or an organic light emitting diode (OLED) display. A diffusion sheet 32 is attached to the rear surface of the image display module 30 by a locally arranged tape member 31. The tape member 31 is, for example, double-sided tape. The light emitting element 29 is, for example, a light emitting diode (LED). The lens 28 increases the brightness of the light emitting element 29.

The panel device 4 includes a light attenuation layer 37 to blacken the panel unit 8. The light attenuation layer 37 is a tinted layer and is located between the light source 9 and the light-blocking layer 10. In the present example, the light attenuation layer 37 is arranged on the rear surface of the light-blocking layer 10. The light attenuation layer 37 is formed by performing, for example, laser printing, screen printing, ink-jet printing, pad printing, or the like.

The light attenuation layer 37 includes a light-transmitting section 42 that extends through the light attenuation layer 37 and is disposed to be continuous with the window frame 22. The light-transmitting section 42, for example, is larger than the window frame 22 or has the same size as the window frame 22. The image displaying unit 23 emits light from the rear side of the panel unit 8 and displays the image 24 on the panel unit 8 with the light passing through the window frame 22 and the light-transmitting section 42.

Figure 4:
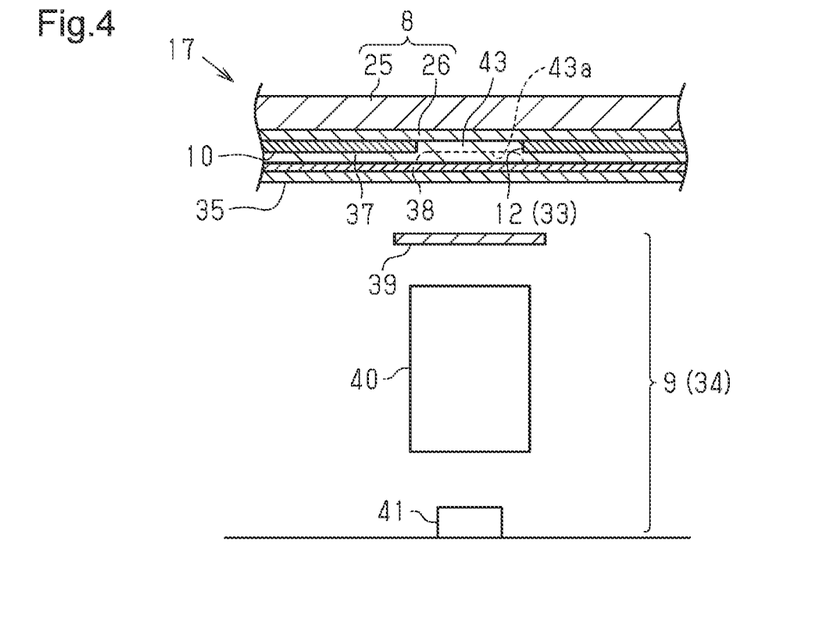
FIG. 4 is a cross-sectional view showing the structure of a symbol portion.

As shown in FIG. 4, each symbol portion 17 includes a mark opening 33 that serves as the opening 12, a light projector 34 that serves as the light source 9, and a detector 35. The mark opening 33 is shaped in correspondence with a mark 36 that serves as the representation 13. The light projector 34 emits light from the rear side of the panel unit 8 through the mark opening 33 to display the mark 36, which is shaped in correspondence with the mark opening 33, on the panel unit 8. The detector 35 is located inward from the mark opening 33 to detect when the panel unit 8 is touched at the mark opening 33.

The specific structure of the symbol portion 17 will now be described. Each mark opening 33 is formed in the light-blocking layer 10 and shaped in correspondence with the mark 36. For example, when the device 3 is the air conditioner 5, the mark 36 includes at least one of a front window defroster mark, a rear window defroster mark, a seat heater mark, an automatic operation mark, an air recirculation mark, an outside air mark, an air conditioner mark, and an OFF mark. The light attenuation layer 37 is formed on the entire rear surface of the light-blocking layer 10 and fills each mark opening 33.

The detector 35 is attached to the rear surface of the light attenuation layer 37 by a tape member 38. The detector 35 is, for example, a capacitance sensor. Alternatively, the detector 35 may use, for example, a resistive film, surface capacitance, projected capacitance, an ultrasonic surface acoustic wave, an optic sensor, or electromagnetic induction. The detector 35 detects when the panel unit 8 is touched at the mark 36. For example, the detector 35 has the shape of a sheet. The detector 35 is transparent (transparent electrode) so that the light from the light source 9 reaches the panel unit 8.

The light projector 34 includes, for example, a diffusion sheet 39, a lens 40, and a light emitting element 41. The diffusion sheet 39 is located between the detector 35 and the lens 40. The diffusion sheet 39 is, for example, a white sheet that transmits light. The light emitting element 41 is, for example, a light emitting diode (LED). The lens 40 increases the brightness of the light emitting element 41.

The light attenuation layer 37 includes a filling portion 43 that fills the mark opening 33. The filling portion 43 of the light attenuation layer 37 is, for example, arranged in conformance with the mark opening 33. In the light attenuation layer 37, when the filling portion 43 is formed in conformance with the mark opening 33, a recess 43a is formed in the rear surface of the filling portion 43.

Figure 5:
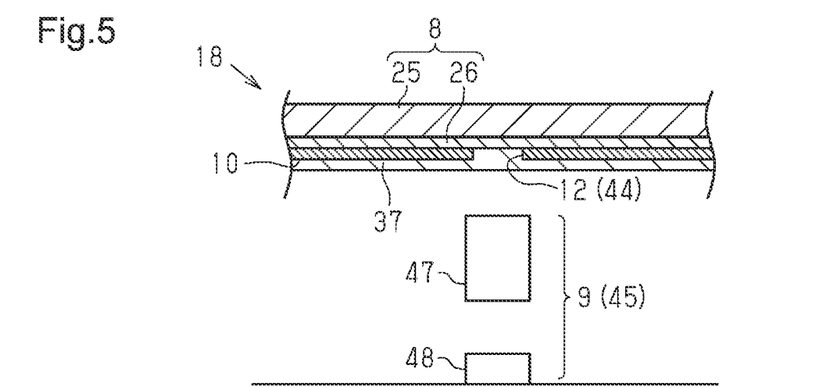
FIG. 5 is a cross-sectional view showing the structure of an indicator portion.

As shown in FIG. 5, each indicator portion 18 includes an indicator opening 44 that serves as the opening 12 and a light projector 45 that serves as the light source 9. The indicator opening 44 is shaped in correspondence with an indicator 46 that serves as the representation 13. The light projector 45 emits light from the rear side of the panel unit 8 through the indicator opening 44 to display the indicator 46, which is shaped in correspondence with the indicator opening 44, on the panel unit 8.

The specific structure of the indicator portion 18 will now be described. The indicator opening 44 is formed in the light-blocking layer 10 and shaped in correspondence with the indicator 46. The indicator opening 44 is, for example, circular. A single indicator portion 18 or multiple (three in present example) indicator portions 18 are provided for a single symbol portion 17. When multiple indicator portions 18 are provided for a single symbol portion 17, the indicator portions 18 are, for example, located adjacent to one another. The light attenuation layer 37 is arranged on the rear surface of the light-blocking layer 10 and fills each indicator opening 44. The symbol portion 17 and the indicator portion 18 do not have to share the same light attenuation layer 37 and may use separate light attenuation layers 37.

The light projector 45 includes, for example, a lens 47 and a light emitting element 48. The light emitting element 48 is, for example, a light emitting diode (LED). The lens 47 increases the brightness of the light emitting element 48.

Figure 6:
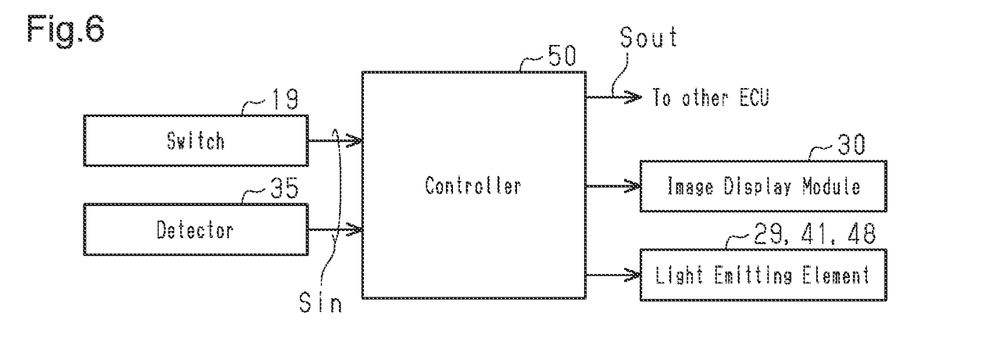
FIG. 6 is a diagram showing the electric configuration of the panel device.

As shown in FIG. 6, the panel device 4 includes a controller 50 that controls the panel device 4. The controller 50 receives inputs from the switches 19 and the detector 35. The controller 50 sends an output to another ECU, the image display module 30, and the light emitting elements 29, 41, and 48. The controller 50 detects a user operation performed in the panel unit 8 based on input signals Sin from the switches 19 and the detector 35. Then, the controller 50 outputs an operation signal Sout corresponding to the detection result to the other ECU. The other ECU is, for example, the ECU of the device 3. The controller 50 controls the image display module 30 and the light emitting elements 29, 41, and 48 based on the input signals Sin to switch the state of each representation 13.

The operation of the panel device 4 in the present embodiment will now be described.

Figure 7A:
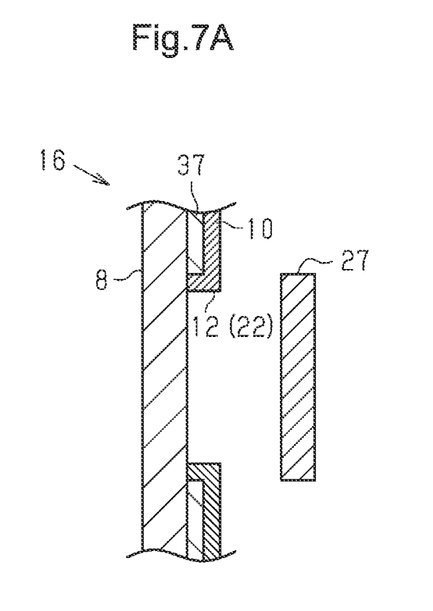
FIG. 7A is a partial cross-sectional view showing a display of a conventional panel device.
Figure 7B:
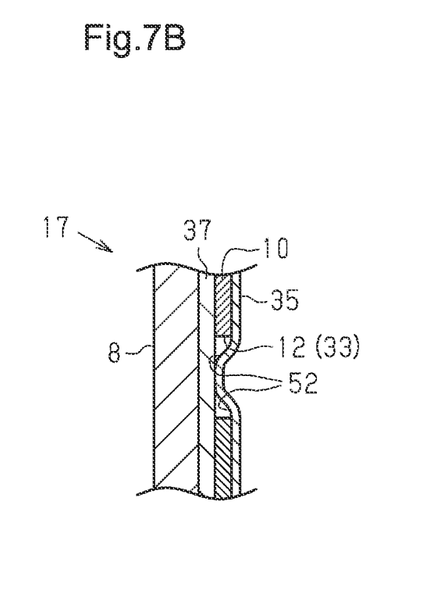
FIG. 7B is a partial cross-sectional view showing a symbol portion of the conventional panel device.

FIG. 7A shows a prior art example of the display 16, and FIG. 7B shows a prior art example of the symbol portion 17. As shown in FIG. 7A, in the conventional display 16, the light-blocking layer 10 is arranged on the rear surface of the panel unit 8, and the light attenuation layer 37 is located between the light-blocking layer 10 and the light attenuation layer 37. Specifically, the light-blocking layer 10 and the light attenuation layer 37 are arranged so that the light attenuation layer 37 is closer to the outer side of the panel unit 8 than the light-blocking layer 10. The light-blocking layer 10 extends along the opening in the light attenuation layer 37. Thus, when the panel unit 8 is viewed from the front, a step formed by the light attenuation layer 37 is noticeable. This adversely affects the aesthetic appeal of the panel device 4.

As shown in FIG. 7B, in the conventional symbol portion 17, a large step is formed between the light attenuation layer 37 and the light-blocking layer 10. Accordingly, for example, when a capacitance sensor sheet or the like acting as the detector 35 is applied to the rear surface of the light-blocking layer 10, gaps 52 may form around the step. Thus, the detector 35 cannot be securely applied to the light-blocking layer 10 and the light attenuation layer 37. This may result in separation of the detector 35 or formation of voids inside the detector 35 and thereby decrease the sensitivity of the detector 35.

Figure 8A:
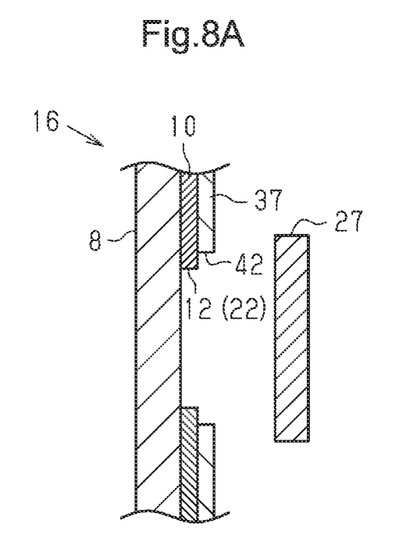
FIG. 8A is a partial cross-sectional view showing a display of the present example.

As shown in FIG. 8A, in the present example, the light-blocking layer 10 is located between the light attenuation layer 37 and the panel unit 8. Specifically, the light-blocking layer 10 and the light attenuation layer 37 are arranged so that the light-blocking layer 10 is closer to the outer side of the panel unit 8 than the light attenuation layer 37. Thus, the light attenuation layer 37 is hidden at the rear side of the light-blocking layer 10 in the display 16. In this manner, the step formed between the light-blocking layer 10 and the light attenuation layer 37 is not visible from the outer side. This improves the aesthetic appeal of the display 16.

Figure 8B:
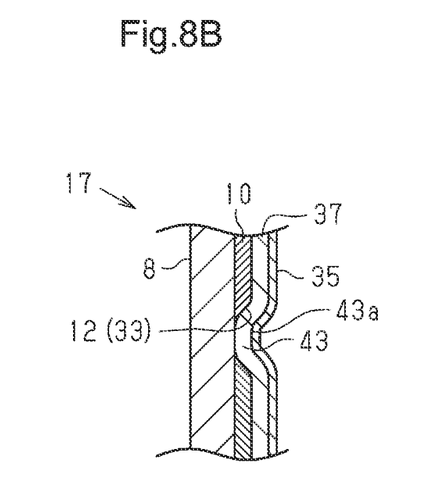
FIG. 8B is a partial cross-sectional view showing a symbol portion in the panel device of the present example.

As shown in FIG. 8B, in the symbol portion 17 of the present example, the light attenuation layer 37 is formed in conformance with the opening in the light-blocking layer 10. Thus, the recess 43a, which is formed in the rear surface of the filling portion 43 of the light attenuation layer 37 that fills the mark opening 33 in the light-blocking layer 10, has a gradually inclining surface. Accordingly, when the detector 35 is applied to the rear surface of the light attenuation layer 37, the detector 35 can be appropriately applied to the rear surface of the light attenuation layer 37. This allows the detector 35 to be applied to the rear surface of the light attenuation layer 37 without forming gaps that would affect the sensitivity of the detector 35.

The panel device 4 in the above embodiment has the following advantages.

(1) The panel device 4 includes the panel unit 8, the light source 9, the light-blocking layer 10, and the light attenuation layer 37. The light attenuation layer 37 is located between the light source 9 and the light-blocking layer 10. With this structure, for example, when the light-blocking layer 10 includes the opening 12, the light attenuation layer 37 is hidden at the rear side of the light-blocking layer 10 around the opening 12 (structure of display 16 in present example). Thus, the step formed between the light-blocking layer 10 and the light attenuation layer 37 will be concealed from the outer side. Further, when the light attenuation layer 37 is arranged in the opening 12 of the light-blocking layer 10 (structure of symbol portion 17 in present example), a member applied to the rear surface of the light attenuation layer 37 (detector 35 in present example) can be arranged in the opening 12. The detector 35 is applied to a gradually curved surface instead of the surface formed by a steep step. This increases the surface of contact between the detector 35 and the light attenuation layer 37. Accordingly, the detector 35 is can be securely applied to the light attenuation layer 37 without affecting the sensitivity of the detector 35. This improves the quality of the panel device 4.

(2) The light attenuation layer 37 is arranged on the rear surface of the light-blocking layer 10. This simplifies the structure of the light-blocking layer 10 and the light attenuation layer 37 in which the light attenuation layer 37 is attached to the rear surface of the light-blocking layer 10.

(3) The panel unit 8 has a black background corresponding to the color of the light-blocking layer 10. With this structure, the panel unit 8 that has a uniform black color improves the aesthetic appeal of the panel device 4.

(4) Each display 16 in the panel device 4 includes the window frame 22 and the image displaying unit 23. With this structure, various images provided by the display 16 can be shown on the panel unit 8. This improves the aesthetic appeal of the panel device 4.

(5) The light attenuation layer 37 includes the light-transmitting section 42 that extends through the light attenuation layer 37 and is disposed to be continuous with the window frame 22. In this case, the step formed between the light-blocking layer 10 and the light attenuation layer 37, which are different in color, cannot be seen through the window frame 22. This improves the aesthetic appeal of the display 16. Further, the light emitted from the image displaying unit 23 (light source 9) can reach the panel unit 8 without passing through the light attenuation layer 37 so that the representation 13 (image 24) is clearly shown on the panel unit 8.

(6) Each symbol portion 17 in the panel device 4 includes the mark opening 33, the light projector 34, and the detector 35. With this structure, the operable marks 36 that are displayed on the panel unit 8 improve the aesthetic appeal of the panel device 4.

(7) The light attenuation layer 37 includes the filling portion 43 that fills the mark opening 33. This structure allows the detector 35 to be applied in conformance with the outer surface shape of the filling portion 43. Thus, the detector 35 can be applied to the light attenuation layer 37 in a manner ensuring the area of contact with the light attenuation layer 37. Thus, when arranging the detector 35 in the mark opening 33, separation of the detector 35 can be avoided.

(8) Each indicator portion 18 in the panel device 4 includes the indicator opening 44 and the light projector 45. With this structure, the indicators 46 displayed on the panel unit 8 improve the aesthetic appeal of the panel device 4.

The present embodiment may be modified as follows. The present embodiment and the following modifications can be combined as long as the combined modifications remain technically consistent with each other.

Two or more of the display 16, the symbol portion 17, and the indicator portion 18 may share, for example, the same lens and light source.

When multiple indicator portions 18 are arranged, the indicator portions 18 may share the same set of a lens and a light source.

The light attenuation layer 37 does not have to be applied to the rear surface of the panel unit 8 and may be attached to, for example, the light source 9.

The light attenuation layer 37 does not have to be applied to the panel unit 8 or the light source 9 and may be located between the panel unit 8 and the light source 9.

The light attenuation layer 37 does not have to include the light-transmitting section 42 and the filling portion 43.

The light-blocking layer 10 and the light attenuation layer 37 may each be a sheet formed continuously on the display 16, the symbol portion 17, and the indicator portion 18. Alternatively, the light-blocking layer 10 and the light attenuation layer 37 may each be sheets separated from one another between the display 16, the symbol portion 17, and the indicator portion 18.

The light source of the display 16 may be a member other than an LED. The same applies to the symbol portion 17 and the indicator portion 18.

The switch 19 is not limited to a toggle switch and may be changed to a push-button, a dial switch, or the like The panel device 4 is not limited for use with a vehicle on-board device and may be used for other devices or apparatus. In other words, the panel device 4 may be installed in any object as long as the object notifies a user of various types of information related to the operation of the device 3 with the representation.

The present disclosure described in accordance with examples is to be considered as illustrative and not restrictive, and the present disclosure is not to be limited to the details given herein, but may be modified within the scope and equivalence of the appended claims.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A panel device, comprising:
   a panel unit that is light-transmissive and one of colored or colorless;
   a light-blocking layer including an opening shaped in correspondence with a representation displayed on the panel unit;
   a light source that emits light from a rear side of the panel unit and displays the representation on the panel unit with the light passing through the opening; and
   a light attenuation layer that attenuates ambient light to further darken light in cooperation with the light-blocking layer,
   wherein the light attenuation layer is located between the light source and the light-blocking layer, and
   the light-blocking layer is a black printed layer, and the light attenuation layer is a tinted printed layer.

2. The panel device according to claim 1, wherein the light attenuation layer is arranged on a rear surface of the light-blocking layer.

3. The panel device according to claim 1, wherein the panel unit includes a black background corresponding to the light-blocking layer in color.

4. The panel device according to claim 1, comprising:
   a display that includes
   a window frame defining the opening; and
   an image displaying unit that serves as the light source and projects an image as the representation from the rear side of the panel unit through the window frame onto the panel unit to display the image on the panel unit.

5. The panel device according to claim 4, wherein the light attenuation layer includes a light-transmitting section extending through the light attenuation layer and disposed to be continuous with the window frame.

6. The panel device according to claim 1, comprising:
a symbol portion that includes
a mark opening that serves as the opening and is shaped in correspondence with a mark serving as the representation,
a light projector that serves as the light source and emits light from the rear side of the panel unit to the mark opening to display the mark, which is shaped in correspondence with the mark opening, on the panel unit, and
a detector arranged inward from the mark opening to detect when the panel unit is touched at the mark.

7. The panel device according to claim 6, wherein the light attenuation layer includes a filling portion that fills the mark opening.

8. The panel device according to claim 1, comprising:
an indicator portion that includes
an indicator opening that serves as the opening and is shaped in correspondence with an indicator serving as the representation, and
a light projector that serves as the light source and emits light from the rear side of the panel unit to the indicator opening to display the indicator, which is shaped in correspondence with the indicator opening, on the panel unit.

\* \* \* \* \*